June 11, 1929.　　A. C. T. ISAAC　　1,717,216
TEMPERATURE INDICATOR
Filed Sept. 18, 1928
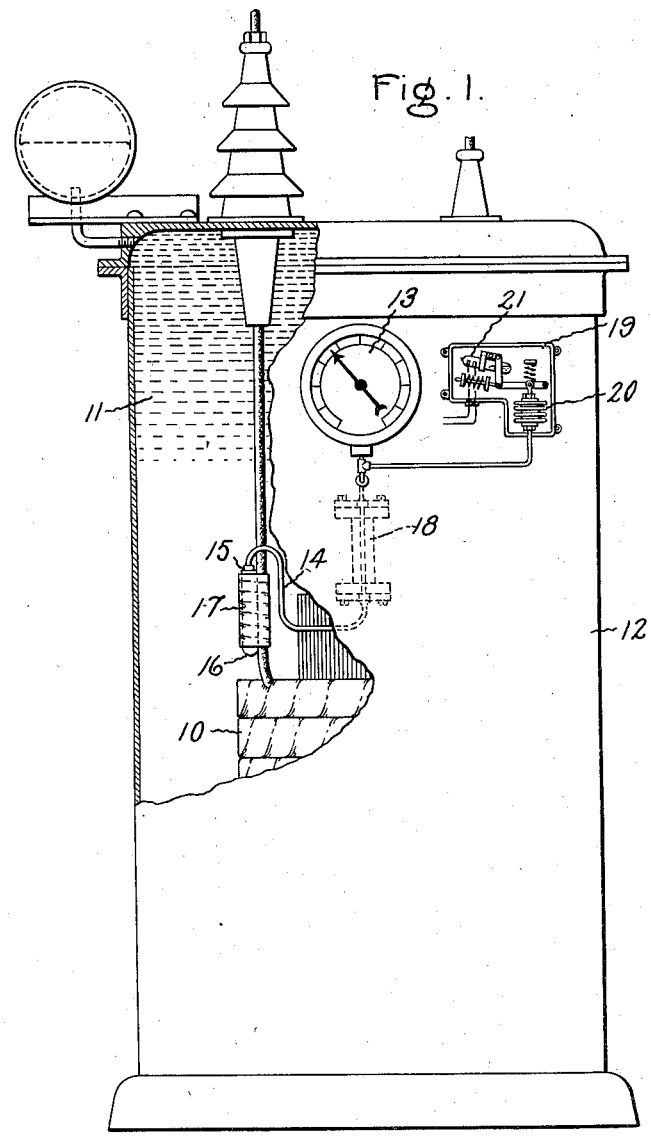
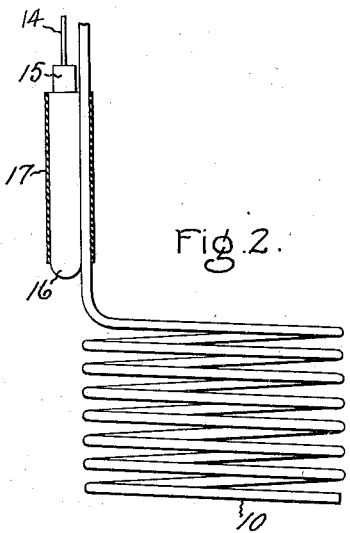
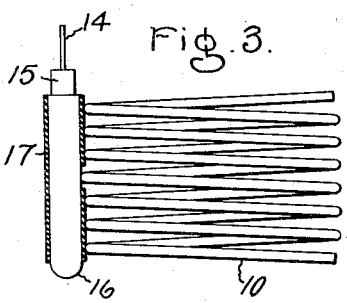
Inventor:
Archibald C. T. Isaac,
by Charles E. Mullan
His Attorney.

Patented June 11, 1929.

1,717,216

UNITED STATES PATENT OFFICE.

ARCHIBALD C. T. ISAAC, OF PITTSFIELD, MASSACHUSETTS, ASSIGNOR TO GENERAL ELECTRIC COMPANY, A CORPORATION OF NEW YORK.

TEMPERATURE INDICATOR.

Application filed September 18, 1928. Serial No. 306,778.

My invention relates to temperature indicators for oil immersed electrical apparatus such as transformers. Such apparatus is heated by its load when in operation and the maximum load which it can carry is limited by its temperature which depends, however, not only upon the load which the apparatus is carrying but also upon the temperature of the surrounding air and upon any auxiliary cooling means which may be provided. It is therefore usually desirable to have at all times an approximate indication of the temperature of the hottest part of the apparatus which is often a part of a conductor or winding carrying current at a high potential. The general object of the invention is to provide an oil immersed electrical apparatus with a simple arrangement for indicating temperature under these conditions. A further object of the invention is to provide an improved arrangement for automatically operating a signal or other form of safety device when the temperature of the apparatus reaches a predetermined maximum value.

The nature and objects of the invention will be better understood from the following description taken in connection with the accompanying drawing in which Fig. 1 shows an oil immersed transformer provided with temperature indicating means arranged in accordance with the invention and Figs. 2 and 3 are enlarged views of details.

Like reference characters indicate similar parts in the different figures of the drawing.

The invention will be explained as applied in connection with a transformer 10 immersed in a body of insulating oil 11 enclosed in a casing 12 as shown in Fig. 1 of the drawing. The temperature of the transformer is indicated by a pressure operated instrument 13, such as a Bourdon tube type of thermometer instrument, connected by a tube 14 to a bulb 15. This bulb 15 rests in a casing 16 which is open at its top so that the space around the bulb inside the casing is filled with oil. The casing 16 is of metal or any good heat conducting material and is secured in good thermal connection with a conductor of the transformer at a point where the temperature is near that which it is desired should be indicated by the instrument 13. The casing 16 is preferably in actual metallic connection with the conductor and soldered to it after removing, if necessary, some insulation from the conductor. An arrangement is shown in Fig. 3 in which the casing 16 is connected to one of the turns of a winding of the transformer and another arrangement is shown in Figs. 1 and 2 in which the casing 16 is connected to the conductor just outside the transformer winding.

At least a small part of the casing 16 which is nearest the conductor is of course always at the same temperature as that of the conductor. There is a tendency, however, for the surrounding oil to cool the remainder of the casing 16 to a temperature below that of the conductor. The casing 16 or the casing and a short section of the conductor is enclosed in sufficient heat insulation 17 to prevent this cooling effect of the oil and to keep the casing 16 and bulb 15 at the same temperature as that of the conductor.

There is little or no electrical insulation between the bulb 15 and the conductor so that with the usual form of connecting tube between the bulb 15 and the instrument 13, the instrument would be at the same voltage as that of the conductor and this voltage might be dangerously high. A section 18 of the tube 14 is therefore formed of insulating material such as some suitable moulded compound. The bulb 15 contains a liquid such as benzole which has high insulating strength, the vapor of this liquid extending through the tube 14 to the instrument 13 which it operates by its pressure. The instrument 13 is thus effectively insulated from the transformer conductor and from the entire bulb structure including the bulb 15 itself and its casing 16.

While the transformer is in operation, the highest temperature is usually at some point inside the winding commonly called the hot spot. The temperature of the hot spot, however, is usually not much above that at the surface of the winding or even of the conductor just after it leaves the winding. In many cases, therefore, it is considered desirable to connect the bulb structure of the indicator at the more easily accessible part of the conductor either at the surface of the winding as shown in Fig. 3 or just outside the winding as shown in Figs. 1 and 2. An exact indication of the hot spot temperature is usually not so important as an indication of any sudden general increase in temperature of the transformer such as may be caused by some trouble either in the transformer itself or in some circuit to which the transformer is connected.

Besides being connected to the instrument 13, the tube 14 is also connected to a thermo-pressure type of relay 19. This relay 19 includes a member 20 which expands and contracts in response to changes in the vapor pressure in the tube 14. The member 20 acts through suitable mechanism to operate a mercury switch 21 when the temperature of the bulb 16 reaches a predetermined maximum value, the switch 21 closing contacts which may operate some safety device such as a visual or audible signal or a switch for disconnecting the transformer from its outside circuits. The expansion and contraction of the member 20 change the volume of the vapor which operates the relay 19 and the instrument 13 but these changes in volume do not affect the pressure of the vapor or the accuracy of the instrument 13 but merely cause some of the vapor to condense or some of the liquid in the bulb 16 to evaporate.

The invention has been explained by describing and illustrating certain forms thereof as applied in connection with an oil immersed transformer but it will be apparent that various changes may be made without departing from the scope of the invention as defined in the appended claims.

What I claim as new and desire to secure by Letters Patent of the United States, is:

1. The combination with oil immersed electrical apparatus, of a temperature indicating instrument, a bulb structure supported close to a conductor of said apparatus, a tube connecting said instrument and said bulb structure, said tube having an insulating section, and a liquid having high insulating strength within said bulb structure.

2. The combination with oil immersed electrical apparatus, of a temperature indicating instrument, a bulb structure supported in good metallic connection with a conductor of said apparatus, a tube connecting said instrument and said bulb structure, said tube having an insulating section, and a liquid having high insulating strength within said bulb structure.

3. The combination with oil immersed electrical apparatus, of a temperature indicating instrument, a bulb structure supported close to a conductor of said apparatus, heat insulating material on said bulb structure to maintain its temperature at a value substantially equal to that of the adjacent conductor, a tube connecting said bulb structure and said instrument, and a liquid within said bulb structure.

4. The combination with oil immersed electrical apparatus, of a temperature indicating instrument, a bulb structure supported close to a conductor of said apparatus, a tube connecting said bulb structure with a temperature indicating instrument and with a thermo-pressure device, a liquid within said bulb structure, and a vapor of said liquid extending through said tube to operate said instrument and said thermo-pressure device.

5. The combination with oil immersed electrical apparatus, of a temperature indicating instrument, a bulb structure supported close to a conductor of said apparatus, a tube connecting said bulb structure with a temperature indicating instrument and with a thermo-pressure device, a liquid within said bulb structure, and a vapor of said liquid extending through said tube to operate said instrument and said thermo-pressure device, said tube having an insulating section, and said liquid and vapor having high insulating strength.

In witness whereof, I have hereunto set my hand this 14th day of September, 1928.

ARCHIBALD C. T. ISAAC.